(No Model.)

S. L. JORDAN.
COTTON GIN RIB.

No. 364,176. Patented May 31, 1887.

Witnesses.
J. George Seltzer
R. T. White

Inventor.
Sidney L. Jordan
by E. Planta
Attorney.

UNITED STATES PATENT OFFICE.

SIDNEY L. JORDAN, OF LAKEVILLE, ASSIGNOR TO HIMSELF, AND JOHN A. DUNPHE AND MATHA CARVER, BOTH OF BRIDGEWATER, MASSACHUSETTS.

COTTON-GIN RIB.

SPECIFICATION forming part of Letters Patent No. 364,176, dated May 31, 1887.

Application filed February 7, 1887. Serial No. 226,869. (No model.)

*To all whom it may concern:*

Be it known that I, SIDNEY L. JORDAN, a citizen of the United States, residing at Lakeville, in the county of Plymouth and State of Massachusetts, have invented certain new and useful Improvements in Cotton-Gin Ribs, of which the following is a specification.

The object of my invention is to construct cotton-gin ribs in such manner that the saws will carry the cotton between the ribs without cutting the cotton, thereby rendering it of greater commercial value.

The invention consists in securing rollers on each side of the ribs at the point where the saw-teeth pass between them.

Figure 1:
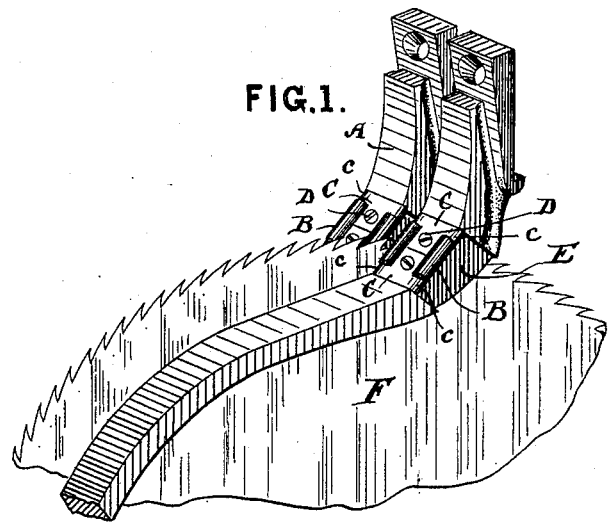
Figure 2:
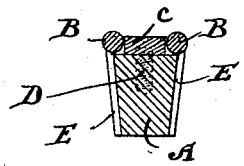
Figure 3:
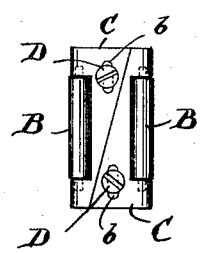
Figure 4:

Referring to the accompanying drawings, Figure 1 represents a portion of a saw and two cotton-gin ribs embodying my invention. Fig. 2 is a section through one of the ribs and its rollers. Fig. 3 shows a modification whereby the rollers may be adjusted. Fig. 4 shows a modified form of roller.

A A represent cotton-gin ribs, to which are secured rollers B B, one on each side, as shown. I prefer to attach the rollers to the rib by means of plates C C, secured to the rib by screws D D. The plates C C are provided with lugs or ears $c$ $c$, into which are journaled the rollers B B. At the rear of the rollers a portion of the rib A is cut away, as shown at E, to allow for clearance of the cotton.

As the saw F, when loaded with cotton, passes between the rollers B B the cotton comes into contact with the rollers, which, being free to rotate, allow the cotton to pass between the ribs without any tearing or cutting action, and the cotton after having passed the ribs is of its original and natural length.

In Fig. 3 I have shown the plates C C divided longitudinally and on an angle, the plates being provided with slots $b$ $b$ for the screws D D to pass through, so that should it be required to adjust the rollers B B a little nearer to or farther from the saw it can be done by pushing the plates one way or the other and then setting the screws D D.

In some cases it may be desirable to give more clearance at the ends of the rollers B. Then I form the rollers larger in the center than at the ends, as shown in Fig. 4; or they may be made of any desired shape to conform to any particular form of rib.

I prefer to make the rollers of hardened steel; but they may be of iron, glass, or any other suitable material.

What I claim as my invention is—

1. In combination with a cotton-gin rib, rollers placed on each side of the rib at or about the point where the saw-teeth pass the rib, substantially as shown and described.

2. The rollers B B and plates C C, in combination with a cotton-gin rib, substantially as shown and described.

3. The rollers B B, plates C C, having slots $b$ $b$, and screws D D, in combination with a cotton-gin rib, substantially as set forth.

In testimony whereof I have signed my name to this specification in the presence of two subscribing witnesses.

SIDNEY L. JORDAN.

Witnesses:
  W. A. CONNELLY,
  E. PLANTA.